United States Patent [19]

Andrews et al.

[11] Patent Number: 4,867,548

[45] Date of Patent: Sep. 19, 1989

[54] LINKAGE ARTICULATED POINTING MIRROR

[75] Inventors: Harold E. Andrews, Simi Valley; Robert W. Adlhoch, Canoga Park, both of Calif.

[73] Assignee: Hughes Aircraft Company, Los Angeles, Calif.

[21] Appl. No.: 889,576

[22] Filed: Jul. 25, 1986

[51] Int. Cl.⁴ ............................................. G02B 27/64
[52] U.S. Cl. ................................................... 350/500
[58] Field of Search ................. 350/500, 539; 358/222

[56] References Cited

U.S. PATENT DOCUMENTS

| | | | |
|---|---|---|---|
| 2,364,371 | 12/1944 | Katzin | 333/21 A X |
| 2,829,352 | 4/1958 | Hennies et al. | 333/253 X |
| 2,853,688 | 9/1958 | Leboutet | 333/22 R X |
| 3,087,130 | 4/1963 | Marcatili | 333/249 |
| 3,219,955 | 11/1965 | Inoue et al. | 333/249 |
| 3,327,250 | 6/1967 | Sleeper, Jr. | 333/21 R |
| 3,552,216 | 1/1971 | Pasquet | 350/500 |
| 3,881,803 | 5/1975 | Parker | 350/500 |
| 3,892,467 | 7/1975 | Shin | 350/500 |
| 4,322,128 | 3/1982 | Brake | 350/500 |
| 4,386,848 | 6/1983 | Clendenin et al. | 350/500 |

FOREIGN PATENT DOCUMENTS 2424010 11/1975 Fed. Rep. of Germany ...... 333/249

OTHER PUBLICATIONS

Netzer, Y., "Line-of-Sight Steering & Stabilization" Optical Engineering, 1,2-1982, pp. 96-104.

Primary Examiner—Bruce Y. Arnold
Attorney, Agent, or Firm—Michael W. Sales; Wanda Denson-Low

[57] ABSTRACT

An improved mirror pointing method and apparatus which stabilizes a mirror relative to the line-of-sight of the input image. The invention includes an outer gimbal pivotally mounted on a pedestal which is in turn attached to a reference frame. An inner gimbal is pivotally mounted on the outer gimbal and the mirror is separately pivotally mounted on the outer gimbal. A linkage is provided between the inner gimbal and the mirror to stabilize the mirror relative to the line-of-sight of the input image. In a more specific embodiment, the outer gimbal and the inner gimbal are stabilized. Thus, a rate detector is provided for detecting angular turning rates of the inner and outer gimbals in conjunction with torquers and resolvers as is known in the art.

1 Claim, 5 Drawing Sheets

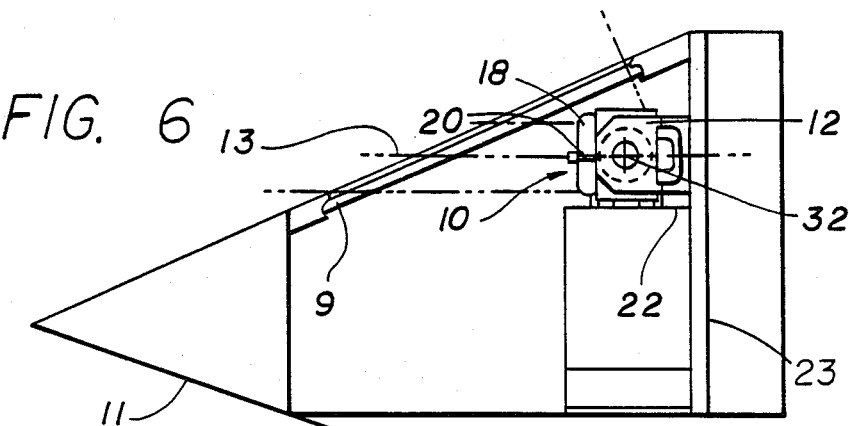
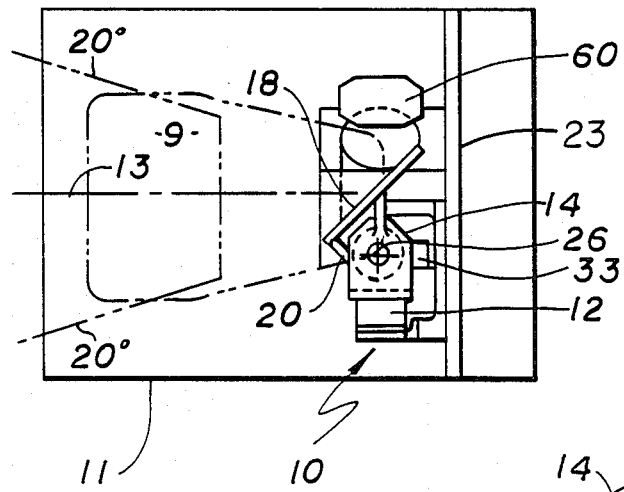
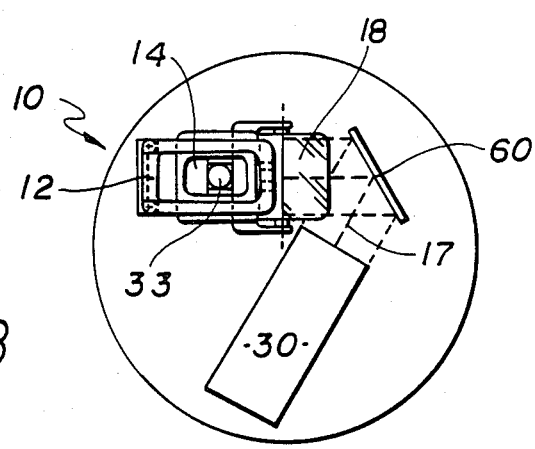

LINKAGE ARTICULATED POINTING MIRROR

STATEMENT AS TO RIGHTS TO INVENTIONS MADE UNDER FEDERALLY-SPONSORED RESEARCH AND DEVELOPMENT

The Government has rights in this invention pursuant to Contract DASG60-85-C-0072 awarded by the Department of Army.

BACKGROUND OF THE INVENTION

1. Field of the Invention

The present invention relates to optical systems. More specifically, the present invention relates to mechanical systems and apparatus used to stabilize an optical line-of-sight.

While the present invention is described herein with reference to an illustrative embodiment in a particular application, it is understood that the invention is not limited thereto. Those of ordinary skill in the art and access to the teachings of the present invention will recognize additional modifications and embodiments within the scope thereof.

2. Description of the Related Art

The current state of the art is such that guided missiles may be equipped with an onboard tracking and guidance system that provides a 'fire and forget' capability. Such capability is desirable in that it permits a launch platform to either launch the missile and move to another tactical position or acquire a second target.

Missiles with an onboard tracking and guidance capability can also effectively meet mission objectives when merely launched into an area within which the target is expected to enter or exist. In this application, the missile acquires and tracks the target while guiding itself to the area or point of contact. This allows for an accurate system which permits a number of missiles to be launched at targets which would not otherwise be within range.

There are numerous missile guidance technologies which provide some or all of these capabilities. Of these, radar guided and optically guided systems are most commonly used. For the purpose of this application, optically guided systems are deemed to include active and passive systems using infrared, laser, and visual targeting and guidance techniques.

The accuracy of most, if not all, of the optical systems is dependent in some measure on the extent to which the line-of-sight on the target is maintained stable on a photodetector or sensor. That is, the incoming optical beam or image must be maintained on the sensor with good acuity and resolution, viz., minimal distortion and/or smear.

This is problematic inasmuch as a missile in flight typically experiences substantial disturbance forces. These forces may be due to atmospheric conditions or torques generated by the onboard guidance system. In any event, the forces tend to jitter components in the optical train causing distortion, smear, image offsets, and other problems.

To stabilize the optical train of missiles in flight, one prior approach has been to mount the sensor on gimbals in the line-of-sight of the input image. However, due to the mass properties of the sensor, this direct approach has been found to be limited. That is, the weight and size of the sensor make it difficult to stabilize the gimbals within the limited space available in a missile nose cone. The additional mass associated with any nuclear shielding would further exacerbate the problem. Thus, a more common solution has been to place a mirror on a gimbal in the optical line-of-sight which deflects the input image to an off-axis sensor.

The mirror is mounted on the inner gimbal and initially stabilized with respect to inertial space. The mirror deflects the input image to an off axis sensor. However, because of the 2 to 1 angular relationship between perturbations in the line-of-sight and perturbations in the reflected image, merely stabilizing the mirror with respect to inertial space is not enough.

To compensate for the mirror effect, many systems endeavor to measure a number of parameters including the missile rotation rate, the instantaneous gimbal angle relative to the sensor and the gimbal angle rotation rate relative to the sensor. These measurements are then used to calculate the mirror correction.

This approach thus provides indirect stabilization in that the correction is provided by calculation, not by a mechanical stabilization on the gimbal per se. However, such indirect stabilization systems cannot always adequately decouple the line-of-sight. That is, the mirror is not stabilized relative to the input image, and only indirectly with respect to an inertial frame of reference. As such, the accuracy of such systems is limited by the performance of the overall system. Consequently, such systems frequently have insufficient servo bandwidth to achieve a high degree of line-of-sight stability. That is, the accuracy of the overall system is dependent on the accuracy of the least accurate component on the measurement and computational chain. In addition, hardware for making the measurements and corrective calculations adds to system weight, cost, complexity and failure risk. Thus there is a general need for a simple, low cost mirror stabilization scheme which offers improved stability relative to those illustrated by the related art.

SUMMARY

The shortcomings of pointing systems illustrated by the related art are addressed by the mirror pointing apparatus and method of the present invention which stabilizes a mirror relative to the line-of-sight of the input image. The invention includes an outer gimbal pivotally mounted on a pedestal which is in turn attached to the missile body. An inner gimbal is pivotally mounted on the outer gimbal and the mirror is separately pivotally mounted on the outer gimbal. A linkage is provided between the inner gimbal and the mirror to stabilize the mirror relative to the line-of-sight of the input image. In a more specific embodiment, the outer gimbal and the inner gimbal are stabilized. That is, a rate detector, servos and resolvers are provided for detecting angular turning rates of the inner and outer gimbals and compensating therefor as is known in the art. Line-of-sight stability is accomplished by sizing the linkage to provide a 2 to 1 angular reduction of the mirror relative to the inner gimbal. Optical line-of-sight stability is preserved in the presence of body motions about the inner gimbal axis so long as the inner gimbal remains inertially fixed. Thus, incident radiation remains substantially directed along a body fixed optical axis in the presence of disturbances which would otherwise cause distortion and smear.

BRIEF DESCRIPTION OF THE DRAWINGS

FIG. 6 is a side view of an illustrative embodiment of the present invention disposed in the environment of an illustrative application.

FIG. 7 is a top view of the illustrative embodiment of FIG. 6.

FIG. 8 is a rear view of the illustrative embodiment of FIG. 6.

DESCRIPTION OF THE INVENTION

The present invention provides a method and apparatus for stabilizing a mirror relative to a line-of-sight using a 2 to 1 linkage between a stabilized inner gimbal and a mirror pivotally mounted on an outer gimbal.

Figure 1:
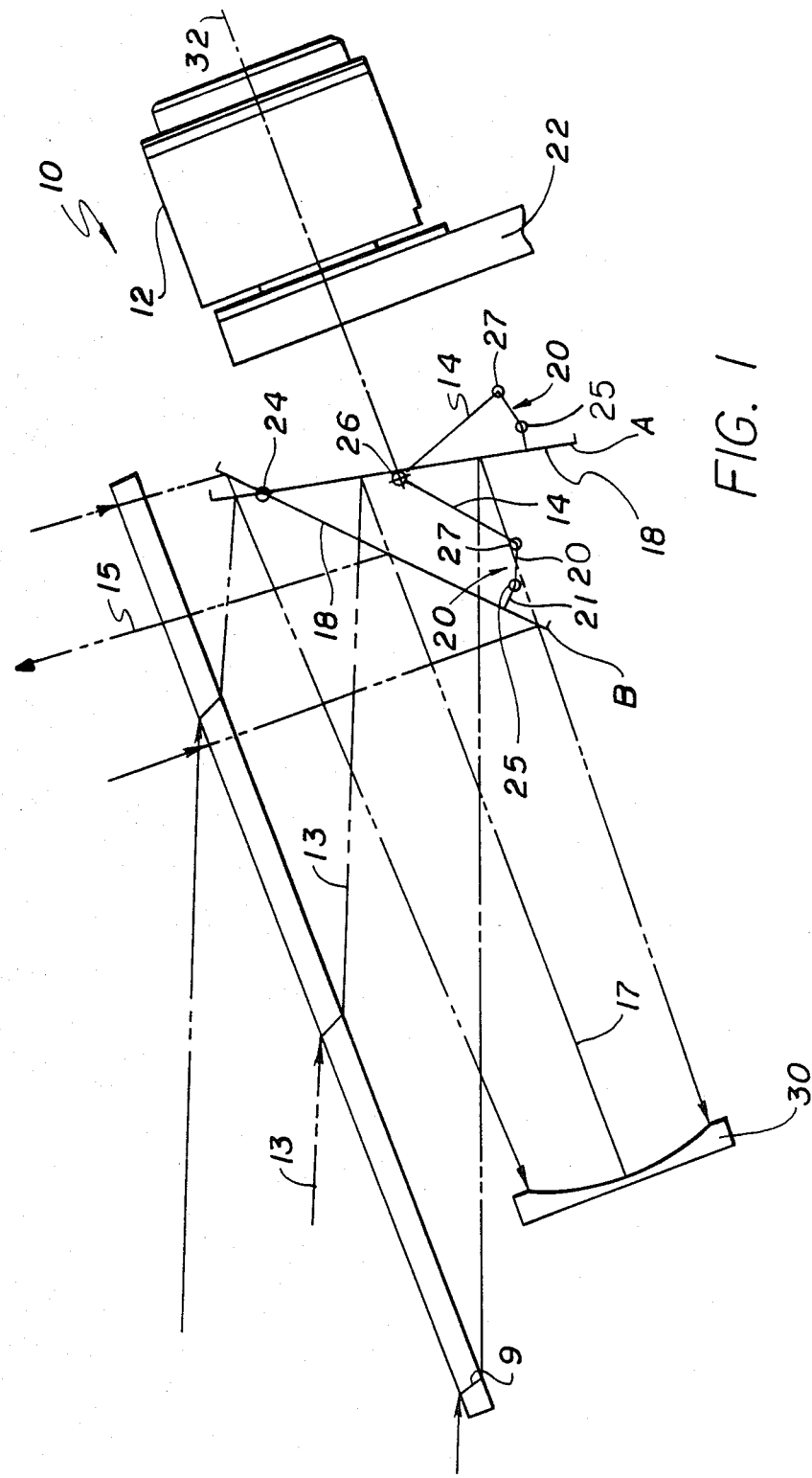
FIG. 1 is a simplified schematic diagram of an illustrative embodiment of the present invention in an illustrative application.

The linkage articulated mirror 10 of the present invention is shown in a schematic diagram in FIG. 1. The invention 10 includes an outer gimbal 12, an inner gimbal 14, a mirror 18 and a floating link 20. The outer gimbal 12 is mounted on a pedestal 22 which is attached to an inertial frame of reference (not shown). The inner gimbal 14 is mounted on the outer gimbal 12. The mirror 18 is pivotally mounted at one end on the outer gimbal structure (not shown) at a pivot or bearing 24 and at the opposite end to the inner gimbal 14 via the floating link 20. Hence, the gimbals 12 and 14 provide a two axis platform for the mirror 18.

Schematically, the floating link 20 is connected to the mirror leg 21 by a hinge 25. The floating link 20 is also pivotally attached to the inner gimbal 14 by a second hinge 27. Those of ordinary skill in the art will recognize additional means for driving the mirror from the inner gimbal 14 within the scope of the present invention.

Thus, the mirror 18 has a first line-of-sight 13 when it is positioned at 'A' in the counter-clockwise extreme of the two positions depicted in FIG. 1, and a second line-of-sight 15 when the mirror 18 is positioned at point 'B'.

Actuation is accomplished by rotating the inner gimbal 14 about the inner gimbal axis 26. This drives the link 20 as established by the geometry. A force is developed in the link 20 which is applied to the mirror 18 at the link-to-mirror pivot 25 which produces rotation about the outer gimbal bearing 24. Each position of the mirror 18 at or between the extreme angular positions A and B directs optical energy of the input image, entering through the input aperture 9, along the sensor axis 17 to a sensor 30.

The simple linkage shown will not produce a mathematically perfect or true 2 to 1 angular relation between the inner gimbal 14 and the mirror 18 although this is desired. However, by adjusting in combination, the length of the link 20, the length of mirror member 21, the mirror length from attachment to mirror member 21 to outer gimbal bearing 24, the length of the inner gimbal 14 and the spacing between the bearing 24 and the inner gimbal axis 26, an approximation of a 2 to 1 angular reduction with sufficient accuracy or fidelity for practical utilization over a limited angle can be achieved.

Note that the outer gimbal axis 32 is parallel to the sensor axis 17 thus yielding a 1 to 1 gimbal angle to line-of-sight angle requiring no corrective stratagem.

Figure 2:
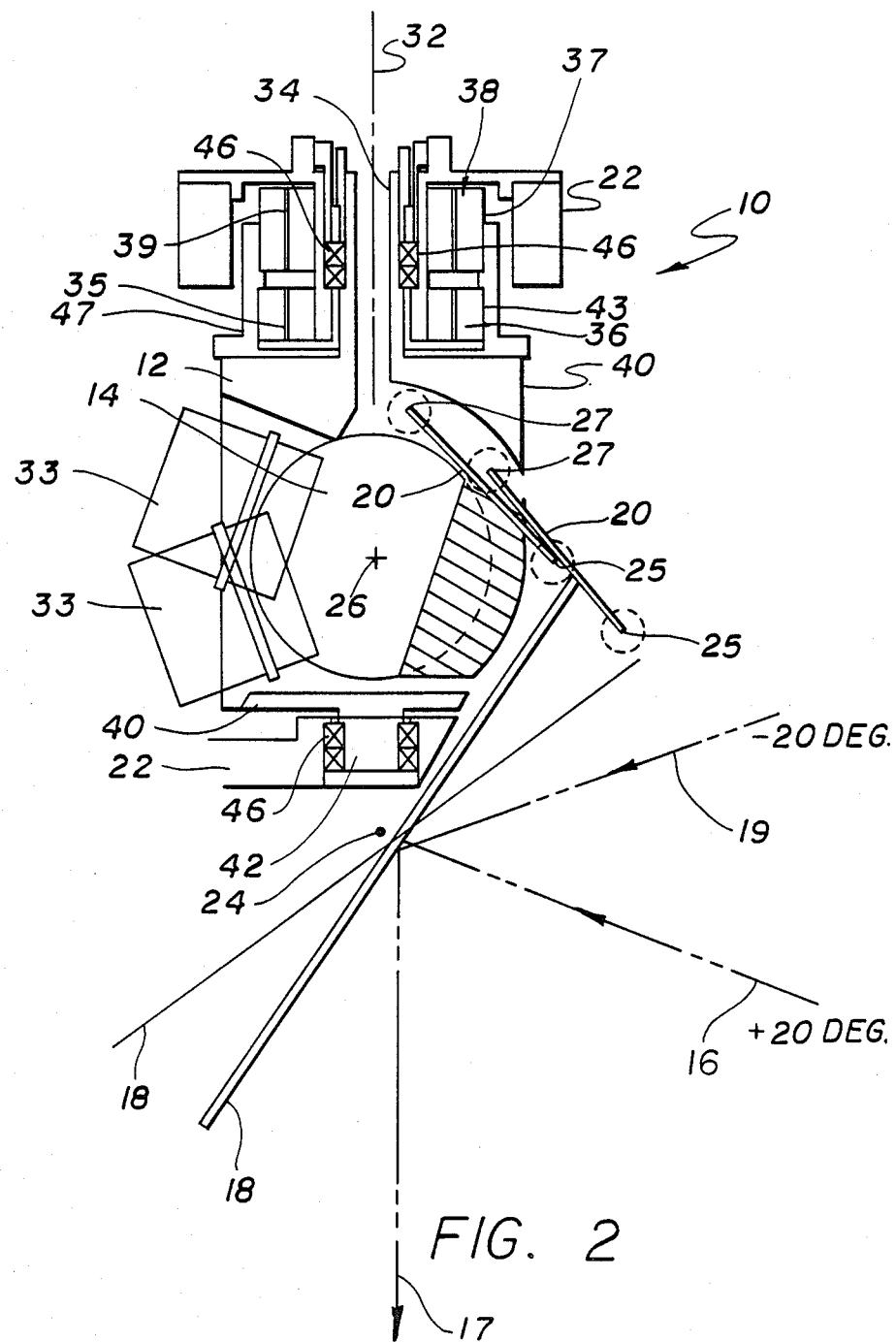
FIG. 2 is a simplified schematic diagram of an illustrative embodiment of the present invention in an illustrative application where the outer gimbal is shown in section.

The sectional view of FIG. 2 shows a practical realization of the schematic embodiment of FIG. 1. Again the outer gimbal axis 32 is parallel to sensor axis 17 and incident radiation from extreme line-of-sight directions 19 and 16 are reflected by the mirror 18 along the sensor axis 17. The mirror 18 is supported at outer gimbal bearing 24 and actuated at pivot 25 by the link 20. The pivot 27, as part of the inner gimbal 14, is constrained to rotate about the inner gimbal axis 26. A two axis rate sensor or gyro 33 is attached to the inner gimbal 14 and oriented such that its insensitive axis, typically the spin axis is parallel to the momentary line-of-sight. Thus, the sensitive axes of the gyro 33 are aligned to measure angular motion of the inner gimbal 14 about two axes perpendicular to the line-of-sight.

The outer gimbal 12 includes a structure 40 that provides pivotal inner gimbal support at the inner gimbal axis 26 and mirror support at the outer gimbal bearing 24. The structure 40 is pivotally mounted on shafts 34 and 42. Shafts 34 and 42 are fitted into bearings 46, defining the outer gimbal axis 32. Protrusion 47 retains the stator 43 of the outer gimbal resolver 36 and the stator 37 of the outer gimbal torquer 38. The rotors 35 and 39 complete the outer gimbal resolver 36 and torquer 38 respectively. The rotors 35 and 39 are support structure integrated or associated with the pedestal 22 and as such are non-gimballed. The torquer 38 induces motion in the outer gimbal 12 while the resolver 36 senses the instantaneous angular position of the structure 40. The rate detector 33, torquer 38, resolver 36 and a control system (not shown) provide for angular positioning and stabilization of the outer gimbal 12 about the outer gimbal axis 32 as is known in the art.

Figure 3:
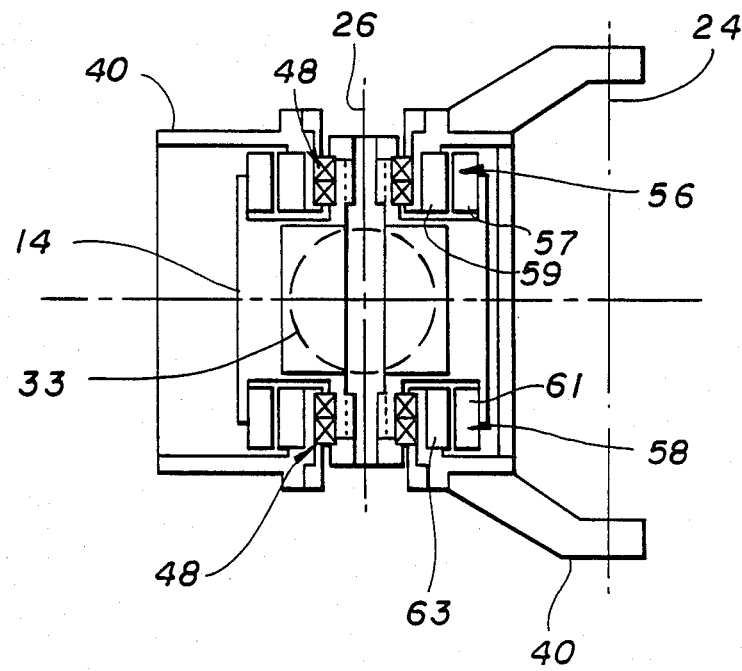
FIG. 3 is a view in section of the inner gimbal and mirror assembly of the illustrative embodiment of the present invention.

FIG. 3 provides a sectional view through the inner gimbal 14. The outer gimbal structure 40 provides pivotal support for the mirror 18 at bearing 24 and for the inner gimbal 14 at axis 26. The inner gimbal 14 supports the rate detector 33. The inner gimbal is suspended within the structure 40 by two sets of ball bearings 48. The inner gimbal to outer gimbal interface includes a torquer 56 and a resolver 58. The torquer 56 and the resolver 58, each having a stator 57 and 61 respectively and a rotor 59 and 63 respectively, are mounted in a manner similar to that described for the outer gimbal 12.

The rate detector 33, torquer 56, resolver 58 and a control system (not shown) provide for angular positioning and stabilization of the inner gimbal 14 about the inner gimbal axis 26 as is known in the art.

Figure 4:
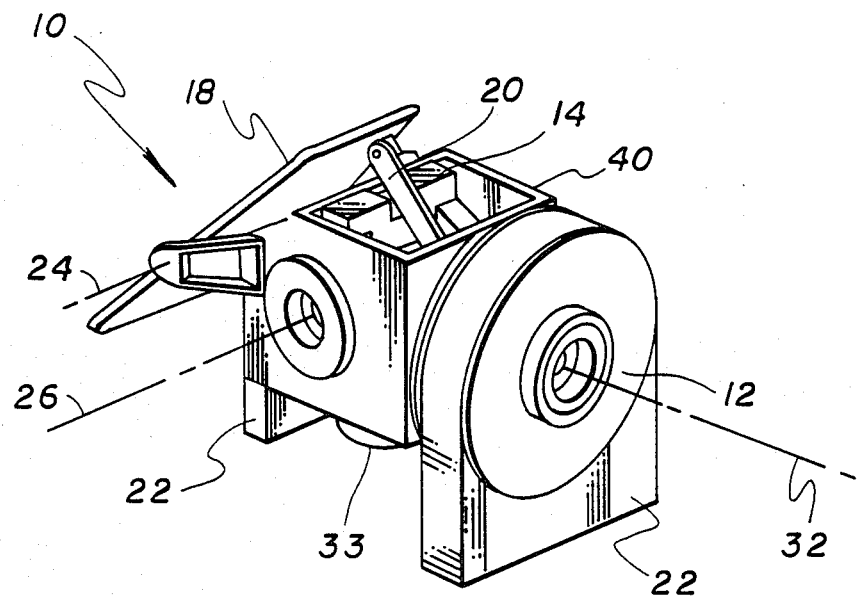
FIG. 4 is a perspective view of an illustrative embodiment of the present invention.
Figure 5:
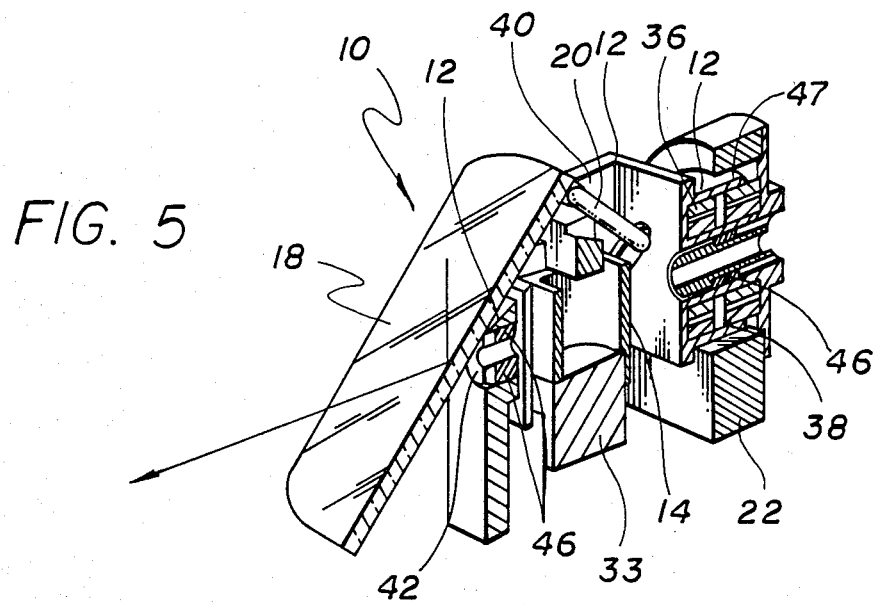
FIG. 5 is a perspective sectional view of an illustrative embodiment of the present invention.

FIG. 4 shows a perspective view of an illustrative embodiment of a linkage articulated mirror 10 constructed in accordance with the teachings of the present invention. FIG. 5 shows another sectional perspective view of the linkage articulated mirror 10 of FIG. 4. In FIG. 5, the outer gimbal 12 is shown mounted within a pedestal 22.

FIGS. 6, 7, and 8 show an application of the invention 10 within a missile nose cone 11. FIG. 6 is a side view looking into the outer axis 32. The pedestal 23 attaches to and is supported by the missile bulkhead 22 with the optical line-of-sight 13 directed through a transparent window or aperture 9. FIG. 7 shows a top view looking along the inner gimbal axis 26. FIG. 8 is a rear view showing the rate detector 33, the optical sensor 30 and the optical sensor axis 17 folded by the fixed mirror 60.

In operation, light entering along the optical line-of-sight 13 is reflected off mirror 18 to the detector 30 either directly as shown in FIG. 1 or indirectly via the optional stationary folding mirror 60 as shown in FIG. 8. Any perturbations of the gimbals along the outer gimbal axis 32 and the inner gimbal axis 26 are detected by the angular rate detector 33. Signals from the detector 33 are provided to a control system (not shown) which returns control signals to the torquers 38 and 56 to stabilize the gimbals relative to an inertial frame of reference. Pointing of the mirror 18 is controlled by the torquers 38 and 56 and the resolvers 36 and 58.

The present invention decouples the perturbations of the gimbals from the optical line-of-sight. This is accomplished by mounting the mirror 18 on the outer gimbal 12 instead of the inner gimbal 14 as is known in the art. The mirror 18 is thereby destabilized relative to the inertial frame of reference. The mirror 18 is stabilized about the inner axis relative to the optical line-of-sight 13 by the 2 to 1 linkage to the inertially stabilized inner gimbal 14. That is, ordinarily, a one degree perturbation, for example, in the pointing angle of the mirror 18 would translate to a two degree perturbation with respect to the position of the reflected image. The provision of a 2 to 1 linkage by the teaching of the present invention requires a two degree change in the angular position of the inner gimbal 14 to cause a one degree change in the pointing angle of the mirror 18. Stated alternatively, the mirror angle changes a mere ½ degree for each degree of rotation of the inner gimbal 14 about its axis 26. Thus, for each degree of perturbation of the inner gimbal 14, the reflected image moves by an amount corresponding to a one degree change in azimuth position of the reflected image. Stabilization of the image thereby becomes directly related to the stabilization of the inner gimbal 14.

Thus the present invention has been described with reference to an illustrative embodiment for a particular application. Those of ordinary skill in the art and access to the teachings of the present invention will recognize additional applications, modifications and embodiments within the scope thereof. For example, the invention is not limited to use in missile systems. The invention could be used in any targeting system or other system where line-of-sight accuracy and stability is desired. For an appropriate application, a linkage ratio of other than 2 to 1 may be used. Further, the mechanical linkage may be replaced with a band drive or other suitable mechanism. In addition, the invention is not limited to any particular arrangement of the gimbals.

It is intended by the appended claims to cover any and all such applications, modifications and embodiments.

Thus what is claimed is:

1. An improved mirror pointing apparatus for stabilizing a mirror relative to a line-of-sight reference comprising:

a outer signal movably mounted on a pedestal about an outer axis, said pedestal being attached to a frame of reference;

means for stabilizing said outer gimbal including first torquer means for selectively changing the position of said outer gimbal relative to said pedestal;

an inner gimbal attached to said outer gimbal for pivotal motion about an inner axis;

means for stabilizing said inner gimbal including second torquer means for selectively changing the position of said inner gimbal relative to said outer gimbal;

a mirror pivotally attached to said outer gimbal; and a linkage pivotally connecting said mirror to said inner gimbal, said linkage including a first arm pivotally connected to said inner gimbal, a second arm connected to said mirror, and a hinge connecting said first and second arms;

whereby said mirror is stabilized between said inner and outer gimbals relative to said line-of-sight.

* * * * *